Oct. 30, 1951     W. W. EMERY     2,573,419
AIR PRESSURE RELIEF FOR ENCLOSURES

Filed July 15, 1946     2 SHEETS—SHEET 1

INVENTOR.
Wilson W. Emery
BY
Webster & Webster
ATTYS

Oct. 30, 1951 W. W. EMERY 2,573,419
AIR PRESSURE RELIEF FOR ENCLOSURES
Filed July 15, 1946 2 SHEETS—SHEET 2

INVENTOR.
Wilson W. Emery
BY
ATTYS

Patented Oct. 30, 1951

2,573,419

UNITED STATES PATENT OFFICE 2,573,419

AIR PRESSURE RELIEF FOR ENCLOSURES

Wilson W. Emery, Glen Ellen, Calif.

Application July 15, 1946, Serial No. 683,671

6 Claims. (Cl. 98—2)

This invention relates to, and it is an object to provide, a novel method and device for relieving or venting excess air pressure from an enclosure having an access door, and in which enclosure the excess pressure is caused by quick closing of such door. As will hereinafter be evident, the present invention is adaptable for use on motor vehicles, refrigerators, etc.

One of the main objects of the invention resides in the fact that the door of the enclosure may be closed easily without the necessity of slamming, assuring of ready and safe latching of the door, with a saving of energy and less wear and tear on the door sealing strip and hardware. The advantage of the above on an automobile or a refrigerator is obvious.

An additional object is to provide for the relief of excess air pressure in enclosures adapted to have a person or persons therein; the device relieving pressure which would otherwise cause discomfort of the eardrums.

Another object of the invention is to embody the invention in enclosed type automobiles, such as sedans, coupés, etc., wherein, when the windows are closed, slamming of one door causes a momentary but substantial pressure rise in the passenger compartment of the automobile in the absence of pressure relief, and results in eardrum discomfort to persons therein.

A further object of the invention is to provide a device, as in the preceding paragraph, which includes a normally closed valve unit arranged, when open, to vent excess pressure; such valve unit being actuated by means such as a reversible electric motor, and there being a door switch controlled reversing circuit operative to cause the motor to open the valve unit whenever a door is opened, and to close the valve unit when the last one of open doors is closed.

A further object of the invention is to provide a practical air pressure relief for enclosures, and one which will be exceedingly effective for the purpose for which it is designed.

These objects are accomplished by means of such structure and relative arrangement of parts as will fully appear by a perusal of the following specification and claims.

While adaptable to other enclosures, as indicated, the invention is here described—for illustration—as used on an automobile.

Figure 1:
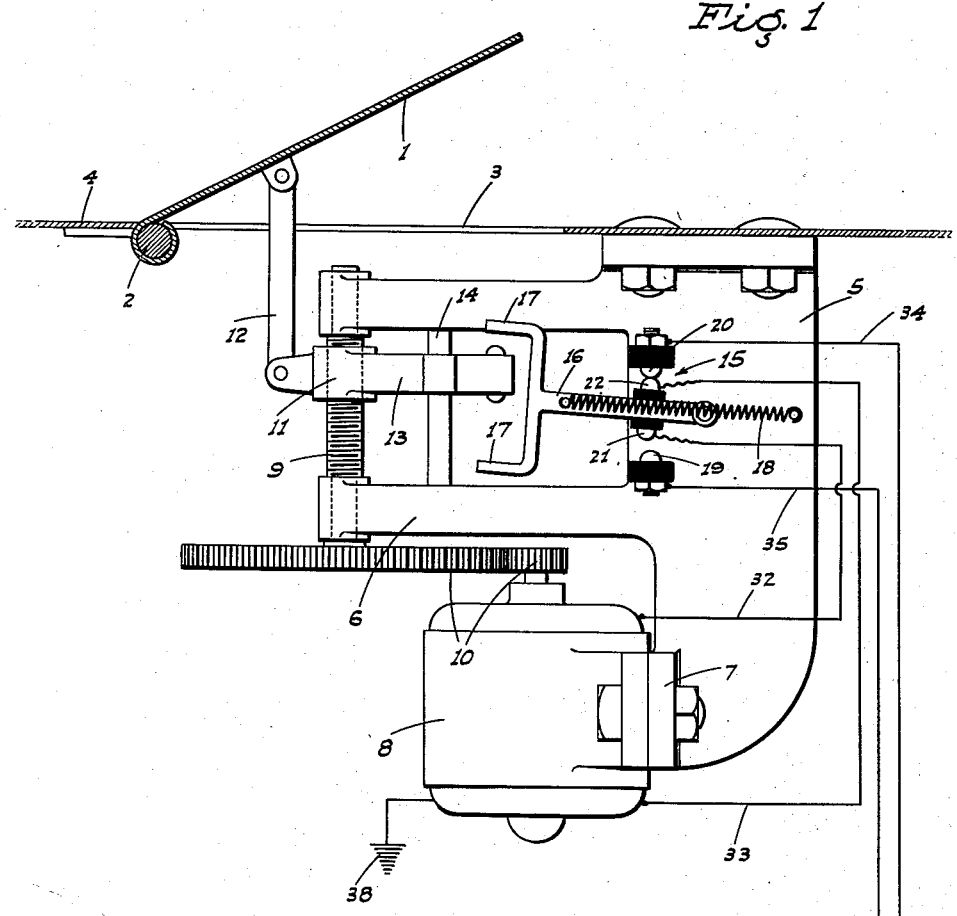
Fig. 1 is a sectional view of the valve unit as hingedly mounted in connection with a portion of the vehicle body; the actuating mechanism being shown, in full lines, as mounted in connection with said body in operative relation to the valve unit. Also, in this view the control circuit is shown diagrammatically.
Figure 1:
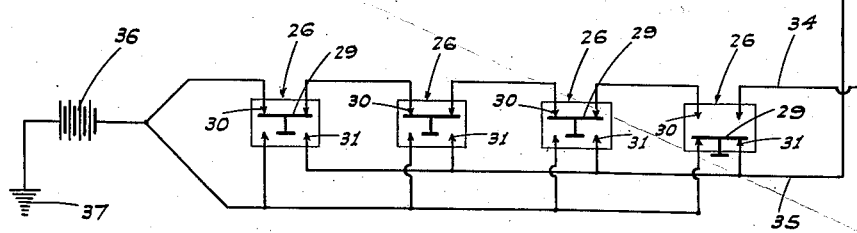
Figure 2:
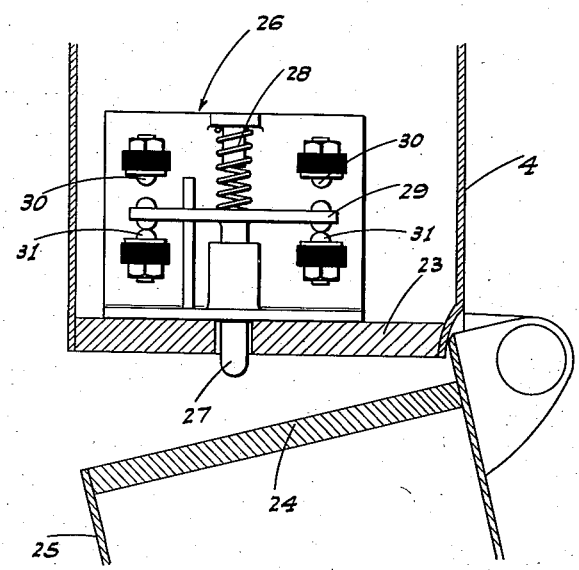
Fig. 2 is a fragmentary sectional plan of the butt portion of an automobile door and the adjacent portion of he door frame; the door being open, and one of the door operated switches being shown, in full lines, as mounted in connection with the door frame.

Referring now more particularly to the characters of reference on the drawings, the valve unit comprises a valve 1 pivoted, as at 2, for opening and closing relative to a port 3 in a part 4 of the vehicle; the port 3 being disposed so that when the valve 1 is open, atmospheric communication is established with the passenger compartment. The vehicle part 4 may be a portion of the body or a door of the vehicle.

The valve 1 is arranged to be power actuated between a normally closed position and an open position by the following actuating mechanism:

A relatively heavy-duty supporting plate 5 is fixed in connection with the part 4 adjacent the port 3 and extends inwardly thereof, said plate including a yoke 6 and a motor supporting bracket 7 inwardly of said yoke.

A reversible electric motor 8 is mounted on the bracket 7 and drives a screw 9 through the medium of a gear train 10; the screw 9 being journaled in connection with and extending between the outer ends of the yoke 6.

A nut 11 runs on the screw 9, and a pivotally mounted link 12 connects between the nut 11 and the valve 1 at the back between its ends. It will be seen that with advance of the nut 11 toward the port 3, the valve 1 will be opened, whereas when the nut 11 moves in the direction of the motor 8 the valve 1 will be closed; the screw 9—which advances or retracts the nut 11—being reversibly driven from the motor 8.

A rigid leg 13 projects from the nut 11 in a direction opposite the link 12 and is guided by a guide rod 14 which extends parallel to the screw 9 below the legs of said yoke 6.

A reversing switch of double pole snap type, indicated generally at 15, is mounted on the supporting plate 5 beyond the free end of the leg 13, and said switch 15 carries a snap action switch arm 16 having spaced ears 17 on the outer end thereof disposed on opposite sides of the leg 13. The arrangement is such that when the nut 11 advances, one of the spaced ears 17 is engaged and the arm is shifted to cause snap action in one direction. When the nut 11 retracts the opposite ear is engaged and snap action is imparted to the arm 16 in an opposite direction; the snap action spring being indicated at 18.

The reversing switch 15 includes a pair of contacts 19 and 20 disposed on opposite sides of the snap action switch arm 16, the latter including complementary contacts 21 and 22, respectively.

Figure 3:
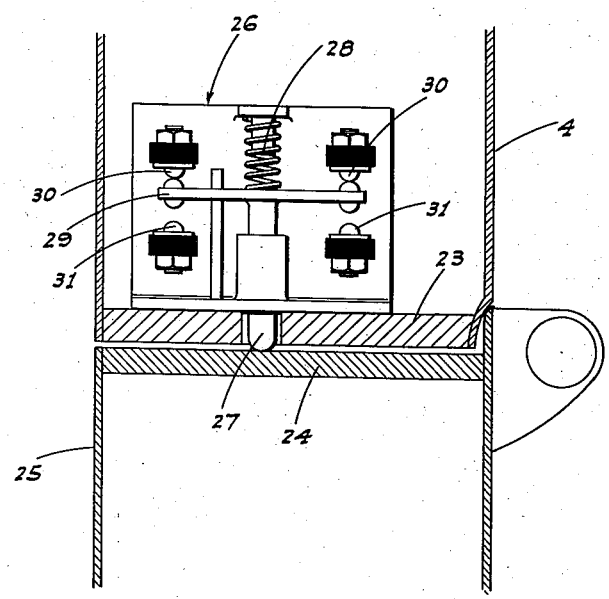
Fig. 3 is a similar view, but shows the door closed, with the adjacent switch in its corresponding position.

The motor 8 is reversibly controlled, from the doors of the automobile, by a reversing circuit comprised of the following:

Each of the door frames 23, adjacent the butt portion 24 of the corresponding door 25 supports, at the back thereof, a double pole push button switch, indicated generally at 26. Each of these switches 26 includes a spring-pressed plunger or push button 27, the spring being shown at 28, and the plunger normally being urged to a retracted position, as in Fig. 3.

The plunger carries a transverse switch bar 29 which, in the normal position of the plunger 27, closes between a pair of contacts 30. When the door 25 opens the plunger 27 is spring advanced, and the transverse switch bar 29 leaves the contacts 30 and closes between another pair of contacts 31.

A pair of lead wires 32 and 33 connect between the contacts 21 and 22, respectively, of the reversing switch 15 and the motor 8. Other lead wires 34 and 35 extend from the contacts 20 and 19, respectively. The contacts 30 of the dual switches 26 are interposed in the wire 34 in series-circuit relation, while the contacts 31 are interposed in wire 35 in parallel-circuit relation, both as shown in Fig. 1. Beyond the switches 26 the wires 34 and 35 connect in common to one terminal of the automobile battery 36 whose other terminal is grounded, as at 37. The motor ground is indicated at 38.

In operation of the device, the valve 1 is normally in closed position, at which time the snap action reversing switch 15 is disposed with the arm 16 in position so that contacts 19 and 21 are engaged. However, the motor 8 is then inactive for the reason that all of the switches 26 are open across the contacts 31 by reason of the plungers 27 being pushed inwardly by the butt portions 24 of the closed automobile doors.

When any one of the automobile doors is opened, the corresponding switch 26 opens between the contacts 30 and closes between the contacts 31. As the contacts 31 of the switches 26 are wired in parallel relationship, the closing of said one switch 26 between its contacts 31 causes energization of the motor 8 in a direction to rotate the screw 9 so as to shift the nut 11 in a valve opening direction, whereby the valve 1 is opened. As soon as the valve 1 is opened the leg 13 engages one of the spaced ears 17 and actuates the reversing switch 15 in a direction so that contacts 19 and 21 separate, stopping the motor 8, and at the same time the contacts 20 and 22 engage. This engagement does not, however, cause reverse operation of the motor 8 for the reason that the contacts 30 of the switch 26 corresponding to the open door 25 have no circuit closed therebetween.

When the open door 25 is shut any excess pressure created in the passenger compartment of the automobile is instantaneously vented through the open port 3 whereby the door closes easily, latches readily, and there can be no resulting discomfort to the eardrums of passengers in the automobile.

Closing of said doors 25 establishes a circuit across the contacts 30 of the corresponding switch 26, and if the other doors of the automobile are already closed, a circuit is completed through wire 34, causing operation of the motor 8 in a valve closing direction. When the valve 1 reaches closed position the leg 13 snaps the reversing switch 15 back to its starting position with the contacts 19 and 21 in engagement.

By reason of the fact that the contacts 30 are connected in series-circuit relation in wire 34, the above valve closing operation of the motor 8 cannot occur until all of the doors of the car are shut, with the switch bars 29 establishing a circuit across all of the contacts 30.

While the invention is described above in connection with a multi-door enclosure, it is not so limited, and may be used equally as well on single door enclosures, whether a passenger compartment or not, as for example on a refrigerator.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A pressure relief valve unit for an enclosed compartment and a normally closed door providing access to the compartment, a valve mounted in connection with the compartment and adapted when open to establish atmospheric communication with the interior of the compartment, the valve normally being closed, a reversible electric motor operative to open and close the valve, a reversing circuit for the motor, said circuit including reversing leads, a reversing switch in the circuit connected to said leads, motor actuated means to reverse said switch when the valve is motor actuated to open or closed positions, and a door actuated switch in said circuit arranged, upon opening or closing of the door, to close the circuit through one lead or through the other respectively.

2. A pressure relief valve unit for an enclosed compartment and a normally closed door providing access to the compartment, a valve mounted in connection with the compartment adapted when open to establish atmospheric communication with the interior of the compartment, the valve normally being closed, a rotatably supported screw, a non-rotatable nut on the screw for movement therealong, a connecting member between the nut and valve, a reversible electric motor, drive means between the motor and screw, a motor reversing circuit having separate motor reversing leads therein and including a reversing switch operated upon movement of the nut, and a door switch in the circuit responsive to opening and closing of the door to close the circuit through one or the other of said separate leads.

3. A pressure relief valve unit for an enclosed compartment and a normally closed door providing access to the compartment, a valve mounted in connection with the compartment and adapted when open to establish atmospheric communication with the interior of the compartment, the valve normally being closed, a rotatably supported screw, a non-rotatable nut on the screw for movement therealong, a connecting member between the nut and valve, a reversible electric motor, drive means between the motor and screw, a motor reversing circuit having separate motor reversing leads therein and including a reversing switch, means responsive to the travel of the nut on the screw to effect operation of the reversing switch, and a door switch in the circuit responsive to the opening and closing of the door to close the circuit through one or the other of said separate leads.

4. A pressure relief valve unit for an enclosed compartment having a plurality of normally closed doors providing access to the compartment, a valve mounted in connection with the compartment adapted when open to establish atmospheric communication with the interior of the compartment, the valve normally being closed, mechanism operative to open and close the valve, and means arranged to cause said mechanism to open the valve when any one of the doors is opened, and to close the valve only after all of the doors are closed; said mechanism including a reversible electric motor, and said means including a reversing circuit having separate motor reversing leads therein, and a switch unit interposed in and actuated by each door, each switch unit being arranged to close in one lead or the other when the corresponding door is opened or closed, respectively, the circuit also including a reversing switch for the motor.

5. A pressure relief valve unit for an enclosed compartment having a plurality of normally closed doors providing access to the compartment, a valve mounted in connection with the compartment adapted when open to establish atmospheric communication with the interior of the compartment, the valve normally being closed, mechanism operative to open and close the valve, and means arranged to cause said mechanism to open the valve when any one of the doors is opened, and to close the valve only after all of the doors are closed; said mechanism including a reversible electric motor, and said means including a reversing circuit having separate motor reversing leads therein, and a switch unit interposed in and actuated by each door, each switch unit being arranged to close in one lead or the other when the corresponding door is opened or closed, respectively, and the switch units closing in said one lead in parallel relation and closing in the other in series relation.

6. A pressure relief valve unit for an enclosed compartment having a plurality of normally closed doors providing access to the compartment, said unit comprising a normally closed valve mounted in connection with the compartment and adapted when open to establish atmospheric communication with the compartment, a reversible motor means connected to the valve to open and close the same, and door operated motor control means mounted adjacent each of said doors arranged to actuate the motor means to open and close the valve upon door opening and closing movements respectively; said several door operated control means, when all the doors are closed, being connected in series whereby closing of all the doors is necessary to effect a valve closing operation of the motor means, and said control means, when all the doors are open, being in parallel whereby opening of any one door will actuate the motor means to open the valve.

WILSON W. EMERY.

REFERENCES CITED

The following references are of record in the file of this patent:

UNITED STATES PATENTS

| Number | Name | Date |
|---|---|---|
| 1,488,198 | Dewey | Mar. 25, 1924 |
| 1,699,220 | Boykin | Jan. 15, 1929 |
| 1,830,323 | Judelson et al. | Nov. 3, 1931 |
| 1,907,727 | Breidert | May 9, 1933 |
| 1,951,905 | Hansen | Mar. 20, 1934 |
| 2,053,172 | Young | Sept. 1, 1936 |
| 2,096,577 | Drake | Oct. 19, 1937 |
| 2,224,494 | White | Dec. 10, 1940 |
| 2,471,971 | Mitchell | May 31, 1949 |